UNITED STATES PATENT OFFICE.

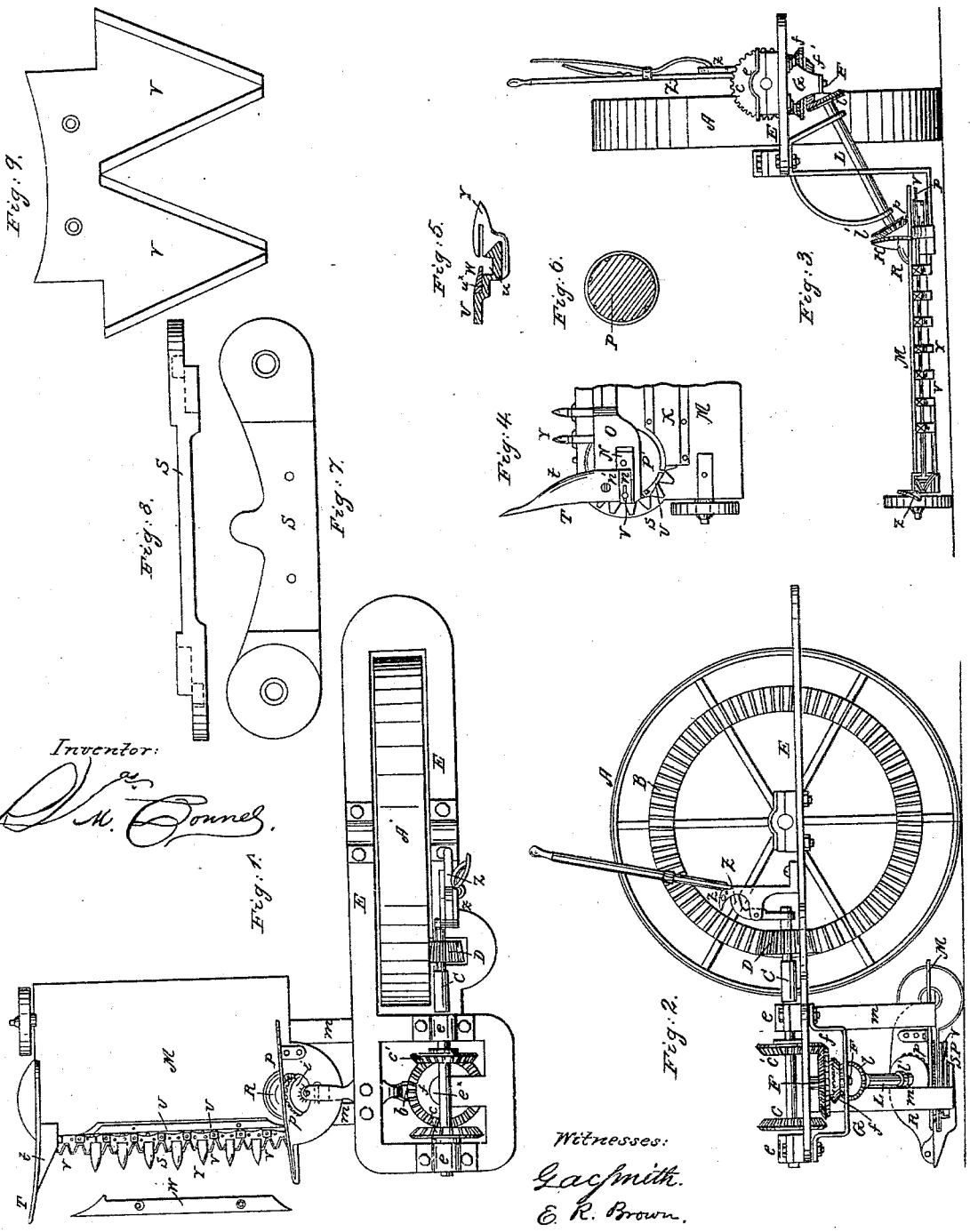

J. M. CONNEL, OF NEWARK, OHIO.

IMPROVEMENT IN HARVESTERS.

Specification forming part of Letters Patent No. 94,871, dated September 14, 1869.

*To all whom it may concern:*

Be it known that I, JAMES M. CONNEL, of Newark, in the county of Licking and State of Ohio, have invented a new and useful Improvement in Harvesters; and I do hereby declare that the following is a full, clear, and exact description thereof, reference being had to the accompanying drawings, making part of this specification, and to the letters of reference marked thereon.

The nature of my invention consists, first, in so arranging an endless chain, to which the cutters of a harvester are attached, that it may be moved to the right or left at the will of the driver; second, in the peculiar arrangement and operation of the mechanism for changing the motion of said endless chain; third, in the peculiar form of the links composing said endless chain; fourth, in the manner in which the cutters are attached to said endless chain; fifth, in forming two or more cutters on each section or link of the endless chain, whereby greater strength and security are attained; sixth, in the peculiar form of the bar to which the fingers are attached; seventh, in the peculiar form of the fingers, and the manner of attaching them to the finger-bar.

To enable those skilled in the art to which my invention appertains to make and use the same, I will proceed to describe its construction and operation.

In the drawings, Figure 1 is a plan or top view of my invention. Fig. 2 is a side elevation. Fig. 3 is a front elevation. Fig. 4 is a view of the under side of the outer end of the platform. Fig. 5 is a transverse section of the finger-bar. Fig. 6 is a horizontal sectional view of one of the grooved pulleys, around which the endless chain passes. Fig. 7 is a plan view of one of the links of the endless chain. Fig. 8 is an edge view of the same. Fig. 9 is a plan view of one of the cutters. Figs. 7, 8, and 9 represent the parts in their full working size.

A represents the main or driving wheel, to which is attached a bevel-gear, B, which gives motion to a horizontal shaft, C, through a pinion, D, attached to said shaft by a spline and feather. The horizontal shaft C is journaled in boxes $e\ e'$ on the frame E, between which boxes, on said shaft, are two bevel-wheels, $c\ c'$, which engage with a bevel-wheel $f$, on a vertical shaft, F, the upper end of which is journaled in a lug, $e^*$, projecting from the frame E, and the lower end in a frame, G, attached to the under side of the frame E. On the vertical shaft F, immediately under the bevel-wheel $f$, is a bevel-wheel, $f'$, which gives motion to an inclined shaft, L, journaled in bearings projecting downward from the frame E. On the upper end of the inclined shaft L is a bevel-wheel, $l$, and on the lower end is another bevel-wheel, $l'$. The platform M is attached to the frame E by two or more braces, $m\ m$, or in any other suitable manner. On the under side of the platform, one at each end, are two grooved pulleys, P P', around which passes the endless chain, to which the cutters are attached. The pulley P is journaled in stationary bearings at the inner end of the platform. The pulley P' is journaled in a plate, N, which is made to slide in a slotted plate, O, at the outer end of the platform. The plate N and the slot in the plate O are beveled or dovetailed, so as to prevent displacement. The outer end of the plate N is bent downward and then outward, so as to form a tongue or extension, $n$, and is provided with a slot, through which a set-screw, $n'$, passes into the plate O.

The endless chain, to which the cutters are attached, is composed of links S, the front edges of which are straight, and the rear edges curved, and formed with tenons, which engage with mortises in the bottom of the grooves on the pulleys P P'.

The links are formed with depressions or recesses on the upper side, for the reception of the cutters, and similar depressions on the under side, which latter may be made to engage with corresponding projections on the pulleys P P' in lieu of the mortises and tenons hereinbefore referred to. Each link is formed with a perforated extension or lug at each end, by which the links are riveted together, one lug being on the upper side and the other on the lower side, so that the links will readily match in attaching them together. The links are made of malleable cast-iron, compressed and finished by means of suitable dies.

The cutters V are made in sections, with two knives to each section, the rear edge being formed with rectangular shoulders, which fit in the depressions on the upper sides of the links, where they are secured by rivets. By making them in this form, two rivets are sufficient to fasten each section.

Attached to the upper side of the inner pulley P is a bevel-wheel, $p$, which meshes into and receives motion from the bevel-wheel $l'$ on the lower end of the inclined shaft L. The bevel-wheels $p$ and $l'$ are protected by a cap-guard, consisting of a semicircular concavo-convexed cap, R, attached to a plate, R', which is secured to the platform in such a manner that the cap R covers a portion of the bevel-wheel $p$, and the plate R' projects vertically at a right angle with the platform.

The pulleys P P' are covered by a semicircular extension at each end of the platform, projecting sufficiently far to protect the cutters as the chain is passing around said pulleys.

The divider T is curved outward, and provided on its inner side with a rounded projection, $t$, which tends to conduct the standing grain to a point immediately in front of the center of the outer pulley P', and also supplies the place of a finger as the cutters move toward it.

The finger-bar U is made of malleable iron, and is formed by rolling, in the usual manner of rolling railroad-rails and other bar-iron. It is attached to the under side of the front edge of the platform by bolts or rivets. On the upper side of the bar, near the point at which it is attached to the platform, is a rectangular depression, $u^*$, in which a wedge-shaped plate, W, is secured in such a manner as to cover the links S of the endless chain, and protect them from injury, and forms a continuation of the front edge of the platform. Forward of this rectangular depression is a groove, $u$, in which the endless chain plays, and which serves as a guide for said chain, and, with the wedge-shaped plate W, prevents any lateral or vertical vibration of the chain. The front edge of the bar is beveled at or about an angle of forty-five degrees, and the lower side is parallel with the bottom of the groove $u$.

The fingers Y are formed with a depression corresponding with the front edge and lower side of the bar, by which means they are readily attached to the bar, and require but a single rivet to each finger, as the beveled front edge furnishes a solid bearing for the beveled portion of the finger. When the fingers are in place upon the bar, the beveled front edge forms an inclined plane in front of the cutters between the fingers, and, when the cutters are in motion, prevents any accumulation of chaff or dirt.

Projecting upward from the frame E is a standard, $z$, to which is pivoted a lever, Z, provided with a spring-lever, the lower end of which engages with a series of holes in the standard $z$, and the lower end of the lever Z is formed into a fork, which engages with the inner end of the horizontal shaft C, by which means the shaft C is readily shifted longitudinally.

A box or casing, X, is attached to the under side of the platform, serving as a protection and guide to the endless chain and cutters as they pass under the platform, and preventing the vibration of the chain between the two rollers.

The driver's seat may be attached at any convenient point on the frame E.

Any suitable form of rake and reel may be used in connection with this machine by providing the proper means for attaching and operating the same; and the chain and cutters and their appurtenances herein described may be applied to any suitable form of machine now in use.

The operation of my invention is as follows: The lever Z being adjusted to the proper position, (the spring-lever engaging with the hole farthest to the rear in the standard $z$,) motion is imparted to the endless chain through the pinion D and bevel-wheels $c', f, f', l, l'$, and $p$, causing the cutters to revolve toward the right-hand end of the platform. The peculiar form of the divider T, with the rounded projection $t$, causes the grain as it is cut to fall toward the center of the platform, thus preventing waste of the grain by falling outside of the platform.

When it is desired to move the cutters toward the left-hand end of the platform, the upper end of the lever Z is moved forward until the spring-lever engages with the front hole in the standard $z$, which movement shifts the horizontal shaft C longitudinally, throwing the bevel-wheel $c'$ out of gear and the wheel $c$ in gear with the wheel $f$, and reversing the motion of the endless chain.

When the cutters are moving from right to left, the plate R' tends to throw the grain as it is cut toward the center of the platform, and prevent it from falling outside.

When it is desired to move the machine from place to place, without operating the chain and cutters, by moving the lever Z to a position midway between the two extreme positions, both of the bevel-wheels $c$ and $c'$ are thrown out of gear, so that no motion is imparted to the endless chain.

When the endless chain has become worn, so as to play loosely around the pulleys, it may be tightened by unscrewing the set-screw $n'$, sliding the plate N to the desired position, and securing it there by screwing down the set-screw $n'$.

Among the advantages attending the use of my improved harvester may be stated the following: When the wind is blowing steadily from a certain direction, the grain will yield to the force of the wind, and bend over in a corresponding direction, rendering it liable to fall outside of the platform, and it is desirable that the cutters should run with a continuous motion in such a direction as to partially overcome this tendency. In going around a field of grain with my improved harvester, supposing the boundaries of the field to correspond with the four cardinal points, and the wind to be blowing from the south-west, giving the stalks of grain an inclination toward the north-east, if the machine starts at the south-east corner of the field, fronting the west, the tendency of the grain will be to fall toward the right-hand end of the platform until the machine reaches the north-west corner of the field, when the tendency of the grain will be to fall toward the left-hand end of the platform until the machine again reaches the south-eastern portion of the field. By running the cutters toward the right-hand end until the north-west corner is reached, and then reversing the motion until the south-east corner is reached, the cutters will strike the stalks on the side opposite to that toward which they are inclined, and partially overcome the tendency to fall outside of the platform.

Having thus described my invention, what I claim as new, and desire to secure by Letters Patent, is—

1. An endless chain with cutters attached, so constructed and arranged that it may be made to move to the right or left at the option of the driver, substantially as shown and described.

2. The links of the endless chain, when formed with depressions on the upper sides for the reception of the cutters, and depressions on the lower sides for engagement with the pulleys, substantially as shown and described.

3. The chain-cutters formed in sections, with two knives to each section, and with the angular shoulders, substantially as shown and described.

4. The finger-bar U, with the rectangular depression $u^*$, the groove $u$, and the beveled front edge, when made as shown and described, for the purpose specified.

5. The lever Z, in combination with the horizontal shaft C, pinion D, and bevel-wheels $c$ $c'$, for starting, stopping, and changing the motion of the chain-cutters, when arranged and operating as herein shown and described.

6. The vertical shaft F and bevel-wheel $f$, in combination with the bevel-wheels $c$ $c'$, when arranged and operating as herein shown and described.

7. The divider T, with its rounded projection $t$, and the vertical guard-plate R', in combination with the chain-cutters, when made and operating as shown and described.

J. M. CONNEL.

Witnesses:
E. R. BROWN,
G. A. C. SMITH.